United States Patent
Wu et al.

(10) Patent No.: US 7,881,183 B2
(45) Date of Patent: Feb. 1, 2011

(54) RECOVERY FROM CONTROL PLANE FAILURES IN THE LDP SIGNALLING PROTOCOL

(75) Inventors: Jing Wu, Stittsville (CA); Michel Savoie, Stittsville (CA); Hussein Mouftah, Ottawa (CA)

(73) Assignee: Her Majesty the Queen in Right of Canada as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 746 days.

(21) Appl. No.: 11/467,953

(22) Filed: Aug. 29, 2006

(65) Prior Publication Data

US 2007/0053359 A1    Mar. 8, 2007

Related U.S. Application Data

(60) Provisional application No. 60/714,837, filed on Sep. 8, 2005.

(51) Int. Cl.
*H04J 1/16* (2006.01)
(52) U.S. Cl. .................. 370/216; 370/217; 370/218
(58) Field of Classification Search ......... 370/216–218, 370/241, 242, 244–245, 248, 250, 310, 351–357, 370/386, 387; 709/238, 250; 711/114
See application file for complete search history.

(56) References Cited

U.S. PATENT DOCUMENTS

| | | | |
|---|---|---|---|
| 7,082,128 B1 | 7/2006 | Aggarwal | |
| 7,130,926 B1 * | 10/2006 | Wu et al. | 709/250 |
| 7,333,438 B1 * | 2/2008 | Rabie et al. | 370/242 |
| 2002/0171886 A1 | 11/2002 | Wu et al. | |
| 2005/0265346 A1 | 12/2005 | Ho et al. | |
| 2006/0034251 A1 | 2/2006 | Sivabalan | |
| 2006/0072480 A1 | 4/2006 | Deval et al. | |
| 2006/0087965 A1 | 4/2006 | Shand et al. | |
| 2006/0092975 A1 | 5/2006 | Ansari et al. | |

OTHER PUBLICATIONS

Jing Wu; Savoie, M.; and Mouftah, H. "Recovery from Control Plane Failures in the LDP Signalling Protocol," Optical Switching and Networking, vol. 2, No. 3, pp. 148-162 Aug. 29 2005.*

(Continued)

*Primary Examiner*—William Trost, IV
*Assistant Examiner*—Ashil Farahmand
(74) *Attorney, Agent, or Firm*—Teitelbaum & MacLean; Neil Teitelbaum; Doug MacLean

(57) ABSTRACT

The invention provides a distributed back-up mechanism and a two-step method for facilitating fast control plane recovery in a switched network. In a preferred embodiment, a Label Information Database (LID) maintained at a control node of a GMPLS network is mirrored to an upstream node using the Label Distribution Protocol (LDP). After a control plane interruption resulting in the LDP restart, the control node, using the mirrored information at the upstream node, conducts first a fast coarse LID recovery wherein only the idle labels are identified, to enable the restarted LDP session to process new connection setup. A detailed LDP state information recovery performs in the background in parallel to the normal LDP operations, e.g. using on-demand LDP queries.

17 Claims, 10 Drawing Sheets

OTHER PUBLICATIONS

Jing Wu; Savoie, J.M.; Montuno, D.Y.; Mouftah, H.T., "Recovery from control plane failures in the CR-LDP signalling protocol," Communications, 2003. ICC '03. IEEE International Conference on, vol. 2, No., pp. 1309-1313 vol. 2, May 11-15, 2003.*

P. Ashwood-Smith; A. Paraschiv; and D. Allan. "Multi Protocol Label Switching Label Distribution Protocol Query Message Description," IETF Network Working Group: Internet Draft. Jun. 2003.*

Wu et al, "Recovery from Control Plane Failures in the CR-LDP and O-UNI Signalling Protocols", Proceedings of 4th Inter'l Workshop on Design of Reliable Comm. Networks, (DRCN '03), Banff, Alberta, Canada Oct. 19-22, 2003, pp. 139-146.

Wu et al, "Improving the Reliability of the Label Distribution Protocol", Proceedings of 26th Annual IEEE Conf. On Local Computer Networks (LCN '01), Tampa, Florida, USA, Nov 15-16, 2001.

Wu et al, "Resiliency of CR-LDP Control Signaling Protocol", Proceedings of 29th European Conference on Optical Comm (ECOC '03), Sep. 21-25, 2003, Rimini, Italy, vol. 5, pp. 106-107.

Leevanivas et al, "Graceful Restart Mechanism for Label Distribution Protocol", IETF RFC 3478, Feb. 2003.

Anderson et al, "LDP Specification", IETF RFC 3036, Jan. 2001.

Jamoussi, "Constraint-Based LSP Setup using LDP", IETF RFC 3212, Jan. 2002.

Mannie, "Generlized Multi-Protocol Label Switching Architecture", IETF RFC 3945, Oct. 2004.

Wu et al, "Recovery from Control Plane Failures in GMPLS-Controlled Optical Newstworks", Inter'l Journal of Comm. Systems, vol. 15, No. 7, pp. 573-592.

Wu et al, "Recovery from Control Plane Failures in the CR-LDP Signalling Protocol", IEEE ICC 2003, vol. 26, No. 2003, pp. 1309-1313.

Wu et al, "Recovery from Control Plane Failures in the LDP Signalling Protocol", Journal of Optical Switching and Networking, vol. 2, No. 3, Nov 2005, pp. 148-162.

Fang et al, "LDP Failure Detection and Recovery", IEEE Comm Magazine, vol. 42, No. 10, pp. 117-123, Oct. 2004.

Jajszczyk, "Automatically Switched Optical Networks: Benefits and Requirements", IEEE Opt. Comm. Supplement, vol. 3, No. 1, IEEE Comm Magazine, vol. 43, No. 2, 2005, pp. S10-S15.

Yates et al, "Control Plane Design for Reliable Optical Netowrks", IEEE Comm. Magazine, vol. 40, No. 2, pp. 90-96, Feb. 2002.

Ashwood-Smith, "Multi Protocol Label Switching Label Distribution Protocol Query Message Description", IETF Draft-ietf-mpls-lsp-query-09.tx., Jun. 2003.

Farrel et al, "Fault Tolerance for the Label Distribution Protocol (LDP),", IETF RFC 3479, Feb. 2003.

* cited by examiner

RECOVERY FROM CONTROL PLANE FAILURES IN THE LDP SIGNALLING PROTOCOL

CROSS-REFERENCE TO RELATED APPLICATIONS

This application claims priority of U.S. Provisional Appln No. 60/714,837 filed Sep. 8, 2005, entitled "Recovery from Control Plane Failures in the LDP Signalling Protocol", which is incorporated herein by reference for all purposes.

TECHNICAL FIELD

The present invention relates generally to communication networks, and more particularly to recovery from control plane interruptions in a communication network.

BACKGROUND OF THE INVENTION

Communication networks require mechanisms for automatic recovery from network failures. These mechanisms may be different for different types of failures, for example for control-level and data-level failures, and may depend on network type. Legacy networks are often based on SONET/SDH systems, wherein network failures typically imply simultaneous control-level and data-level failures because control messages and user information are transmitted together in frames.

MPLS (Multi-Protocol Label Switching) represent an evolution in the routing architecture of IP packet-based networks, wherein data is forwarded using labels that are attached to each data packet. These labels must be distributed between the nodes that comprise the network. MPLS does not replace IP routing, but works alongside existing routing technologies to set-up label-switched paths (LSPs) between ingress and egress nodes, and to provide very high-speed data forwarding at Label-Switched Routers (LSRs) together with reservation of bandwidth for traffic flows along each LSP with differing Quality of Service (QoS) requirements.

Benefits of using MPLS based network architecture include, e.g., better price/performance in routers, scalability, better integration with circuit switched technologies such as Frame Relay and ATM, the ability to implement layer 2 and layer 3 virtual private networks, and improved control of traffic characteristics.

GMPLS (Generalized Multi-Protocol Label Switching) is an extension of the MPLS protocols to circuit-switched, e.g. optical, networks. GMPLS extends the well-known MPLS mechanisms for new interfaces such as wavelength or fiber, introducing many extensions to existing protocols.

According to the MPLS and GMPLS specifications, their respective network models contain the following three functional planes:

a) a transport plane, also referred to as data plane, responsible for traffic transport and switching;

b) a control plane, responsible for connection and resource management, defined as an IP-based plane, which can be either integrated with or separated from the managed transport network;

c) a management plane, responsible for supervision and management of the whole system, including transport and control planes.

To ensure network resilience, appropriate failure recovery mechanism have to be implemented at all three planes of the network. Protection and restoration of the data plane have been extensively addressed and techniques for data-plane protection and restoration are well known in the art. In a GMPLS network, the integrity of the control and data planes is more or less independent when they are physically separate.

The control plane is responsible for the transfer of signaling and routing messages as well as the management of connections and resources, and therefore has to be reliable to ensure reliability of the whole network. Moreover, the majority of the protection and restoration mechanisms in the transport plane requires an efficient signaling network, which is supported by the control plane. A failure in the control plane can have a fundamental impact not only on new but also on existing connections. A reliable and survivable control plane can be achieved by implementing appropriate protection mechanisms and by providing effective recovery procedures, which allow maintenance of the supported services in spite of failures in the control plane. Therefore, it may be beneficial to focus on minimizing service interruptions due to a control plane failure or during its maintenance.

A review of several prior-art methods for control plane recovery in MPLS and GMPLS networks is provided in an article entitled "Recovery of the Control Plane after Failures in ASON/GMPLS Networks" by Andrzej Jajszczyk, and Pawel Rozycki, published in IEEE *Network Magazine*, January/February 2006, which is incorporated herein by reference.

An essential part of a control plane of many MPLS networks is the Label Distribution Protocol (LDP). The LDP protocol is a signalling protocol, which is used to set up, maintain and tear down connections in an MPLS network. The Constraint-based Routing Label Distribution Protocol (CR-LDP) is an extension of the LDP, and is used as a signalling protocol for GMPLS-controlled circuit-switched networks. Between two adjacent control nodes, an LDP session is used to exchange LDP messages and control the corresponding data plane links. A failed LDP session results in the loss of LDP state information, which cannot be automatically recovered in a new restarting LDP session unless a specific recovery mechanism is implemented.

In contrast to the fault tolerance of the resource reservation protocol (RSVP), which uses periodical state refreshments, the LDP is vulnerable to hardware and software failures. Routing protocols such as the Open Shortest Path First (OSPF) or the Intermediate System to Intermediate System (IS-IS) are fairly fault tolerant. They exchange information through periodical link state advertisements. If a control plane failure happens, they can still recover after the fault is fixed and the link state advertisement resumes. The LDP's difficulty in failure recovery is inherent to hard-state protocols, e.g., the Border Gateway Protocol (BGP) and the Private Network to Network Interface (PNNI), because their status information is not automatically refreshed.

The importance of handling control plane failures and recovery for a signalling protocol was identified in the prior art. It was suggested that any control plane failure must not result in releasing established calls and connections. Upon recovery from a control plane failure, the recovered node must have the ability to recover the status of the calls and connections established before the failure. Calls and connections in the process of being established (i.e. pending call/connection set-up requests) should be released or continued with set-up.

Known generic failure recovery techniques for distributed systems or control systems may be applied to the LDP failure recovery. In addition, several techniques have been proposed specifically for the LDP failure recovery. These prior-art techniques are typically focused on control plane failures that are associated with either one of two possible kinds of control plane failures: failure of a signaling channel, failure of a control plane's component, which may be either hardware or software related. These techniques have different assumptions and objectives, resulting in different recovery capability, recovery accuracy and speed, and different implementation overhead and cost:

1. Redundant control node hardware or LDP signaling software. A standby backup control node or LDP signaling module may replace a failed one in real time.

2. Persistent storage of relevant information. After a reboot, such a control node may maintain the LDP state information, configuration information, and control plane neighbor information. This his technique relies on the information stored in the failed node itself, resulting in limited recovery capability.

3. Backup signaling channels, when the LDP messages are re-routed over the backup signaling channels if the primary signaling channel fails; this approach is described, for example, in J. Lang (Ed.) Link management protocol (LMP), IETF draft draft-ietf-ccamp-lmp-10.txt, October 2003, and E. Mannie (Ed.) Generalized Multi-protocol label switching architecture, IETF RFC 3945, October 2004.

4. Message logging, when all LDP messages are securely stored and replayed if a failure occurs. This technique relies on the information stored in the failed node itself, which limits the recovery capability from control node failures. In addition, this technique may be harder to scale to a large network.

5. Graceful restart mechanism for the LDP, wherein a downstream node provides to its upstream neighbor label mapping information that the downstream node preserves through a restart. This technique however, may not be applicable to downstream control node failures.

6. Control plane queries the data plane about the channel status. Depending on the data plane capability, the channel status, e.g., in-use or idle, may be extracted to recover a control node's lost status information.

7. Query-and-reply based LDP state information recovery disclosed in "Distributed call and connection management: signaling mechanism using GMPLS CR-LDP", ITU-T recommendation G.7713.3/Y.1704.3, March 2003. This method can recover detailed LDP state information and is not limited to only recover from the backup state information at direct neighbours; however, is relatively slow and may result in a considerable delay before the node is operational and a new connection can be established.

8. Management system centralized recovery. The network management system may conduct complicated coordination and information transfers, but in a less real time manner.

An alternative solution to recovery has been proposed by the inventors of the present invention in an article entitled "Recovery from Control Plane Failures in the CR-LDP Signalling Protocol," published in IEEE ICC 2003, vol. 26, no. 1, 2003, pp. 1309-13. This article describes a distributed system of control-plane recovery, where each of the upstream nodes maintain a copy, called a Label Information Mirror (LIM), of the Label Information Database (LID) from a respective downstream node. The LIM is created by using Label Mapping and Label Release messages received from the downstream node. In the event of a control-plane failure, the LID is synchronized with the LIM using new LID TLV and LIM TLV objects.

Advantageously, this method provides a unified distributed solution that is equally applicable to both kinds of control-plane failures, the ones related to signaling channels and the ones related to control plane component of the nodes themselves. However, the amount of information within one LID, and accordingly within one LIM, can be significant, and transmitting it from one node to another to accomplish a complete recovery of all LDP state information may take considerable time. It would be advantageous to provide a method for recovery from a control plane failure that is scalable, does not rely on additional hardware and/or additional requirements imposed on the data plane equipment, and enables a fast restoration of at least basic operation capability of a failed node.

Accordingly, an object of this invention is to provide a scalable method of operating a control plane of a communication network that enables a fast return of the control plane to operation after a control plane failure or other interruption, including control plane maintenance.

Another object of the present invention is to provide a communication network node controller that is capable of a fast recovery after a control plane failure.

Another object of this invention is to provide a system for facilitating a fast recovery of a control plane from a failure that does not rely on additional hardware and on specific recovery support features of data plane equipment.

SUMMARY OF THE INVENTION

In accordance with the invention, a method for facilitating fast recovery from a control plane interruption in a communication network is provided. The network comprises at least one node operative to provide connections to data traffic in the network; the control plane comprises a first control means operative to allocate said connections and to maintain connection-related information, a second control means, and a control channel therebetween. The method comprises the steps of A) providing a copy of the connection-related information maintained by the first control means to the second control means to store therein, the connection-related information including first information related to currently unused connections and second information comprising information related to connections currently in use, and B) following an interruption in the control plane, updating the connection-related information maintained at the first control means. The step (B) further comprises the steps of:

(a) transmitting a copy of the first information from the second control means to the first control means;

(b) receiving the copy of the first information at the first control means to update, at the first control means, the first information related to unused connections;

(c) operating the control plane for allocating unused connections to data traffic at the first node by the first control means; and, (d) with the control plane operative to allocate unused connections, updating, at the first control means, the second information using a copy of the second information stored at the second control means.

In accordance with another aspect of this invention, a device is provided for controlling a first node of a communication network that also includes at least a second node. The device comprises a processing means for executing a software application for allocating labels to data traffic between the first and second nodes responsive to requests from a control means for controlling the second node, a memory coupled to the processing means for use by the software application for storing label information, said label information comprising first information related to unallocated labels and second information related to allocated labels, and a port for communicating with said second node via a control link for exchanging label information.

According to this aspect of the invention, the processing means includes means for: sending the label information via the port to the second node for storing therein, receiving a copy of the first information stored at the second node following an interruption in communication with the second node, updating the first information stored in the memory using the copy of the first information received from the control means controlling the second node, and, responsive to a label allocation request, executing the software application for allocating a label to a connection using the updated first information prior to receiving a copy of the second information.

In one embodiment of the invention, the software application is for supporting the Label Distribution Protocol (LDP).

An aspect of the invention provides a method and system to back-up LDP state information and to restore said information after an interruption in LDP operation for enabling establishing new data plane connections. According to this aspect of the invention, the LDP state information maintained by a downstream node is provided its peer upstream node for storing therein, and is synchronized with the LDP state information maintained by the downstream node using LDP signaling when connections are set-up or torn-down. A two-step recovery method includes the step of fast and coarse LDP state information recovery during the initialization of a restarting LDP session, wherein only information related to unallocated labels is provided by the upstream node to the downstream node; and the step of a detailed LDP state information recovery running in parallel to normal LDP operations.

BRIEF DESCRIPTION OF THE DRAWINGS

The invention will be described in greater detail with reference to the accompanying drawings which represent preferred embodiments thereof, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that the invention can be practiced without one or more of the specific details, or with other methods, components, devices, etc. In other instances, well-known structures, devices, or operations are not shown or described in detail to avoid obscuring aspects of the invention.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

Figure 1:
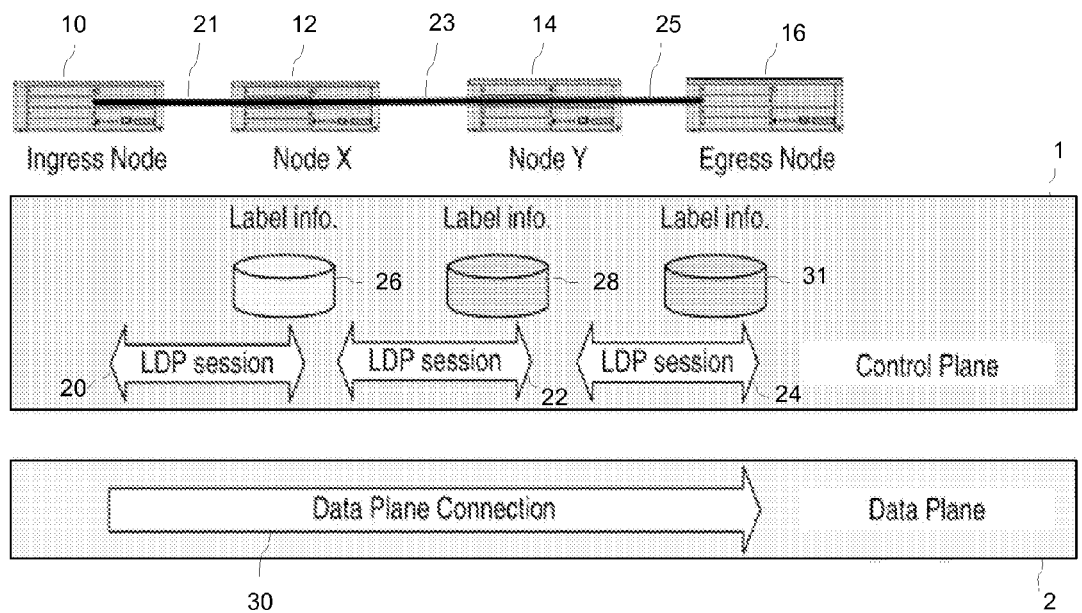
FIG. 1 is a diagram illustrating a portion of prior-art MPLS network.

Before turning to a detailed description of exemplary embodiments of the present invention, several terms and notations used in the specification will be defined with reference to FIG. 1, which schematically illustrates a portion of a communication network comprising a plurality of interconnected nodes. The shown portion of the communication network includes nodes 10, 12, 14 and 16, which are operative to provide switched connections for incoming and outgoing data traffic via physical communication links 21, 23 and 25, by allocating required data forwarding resources at each node. The physical links 21, 23 and 25 may support one or multiple communication channels and may be implemented using any type of physical medium such as, e.g., an optical medium, wireless medium, twisted pair, etc.; in one embodiment, the links include optical fibers for carrying optical signals, e.g. using the Dense Wavelength Division Multiplexing (DWDM) technology.

Data traffic between each of the nodes is typically spread over multiple communication channels, i.e. includes portions that are handled differently by the nodes' equipment, and require separate resource provisioning. For example, separate forwarding and/or switching resources may have to be provisioned by a node for data traffic having different ingress and/or egress nodes. In reconfigurable DWDM networks having optical cross-connects (OXC) or reconfigurable optical add-drop multiplexers (ROADM) at network nodes, these separate resources may be associated with different wavelength channels and/or different input/output ports of an OXC or a ROADM, and may also include wavelength converters; in packet-switched networks, they may include bandwidth provisioning means in packet routing and switching equipment. The term "connection" is generally understood herein as a provision for a signal to propagate from one point in a network to another, such as from one node to another, or from an input port to an output port of a same node. In the network considered herein, the task of resource provisioning to allocate a connection, and the task of providing the allocated resources, i.e. switched connections for incoming and outgoing traffic, are performed separately and associated with control and data planes of the network, which are schematically labeled in FIG. 1 with reference numerals '1' and '2', respectively.

The current invention will be described herein in relation to communication networks that have at least two separate operational planes associated therewith, namely the control plane 1, and the data plane 2, also referred to hereinafter as the forwarding plane 2; a third management plane not illustrated in FIG. 1 can also be present. The data, or forwarding, plane performs operations on data traffic, such as providing and switching connections for incoming and outgoing data traffic at network nodes, wherein the term "connection switching"

for the purpose of this specification is understood to include routing and/or forwarding of data traffic by a network node. The forwarding plane includes special-purpose hardware for operating on data traffic, e.g., network processors that perform wire-speed packet or frame/cell processing operations, optical ROADMs, switches, and OXCs.

The control plane 1 is understood herein as infrastructure and distributed intelligence that controls the establishment and maintenance of connections in the network, and includes, in addition to control hardware, protocols and mechanisms to disseminate connection-related information; the control plane can also include algorithms for engineering an optimal path between end points. The control plane performs the call control and connection control functions. Through signalling, the control plane sets up and releases connections, maintains local connection information, and may restore a connection in case of a failure. The control plane also performs other functions in support of call and connection control, such as routing information dissemination. The control plane may include software applications written in a high-level language such as C or C++ for executing on a general-purpose processor.

The management plane provides an administrative interface and system management capabilities into the overall system; it typically includes software executing on a general-purpose processor, and may include peripheral circuits, monitors etc.

Specific embodiments of the invention are described hereinafter in the context of a GMPLS network, although this is not a necessary requirement for carrying out the present invention, which can be applicable also to non-GMPLS networks that employ data traffic routing and/or switching based on control-plane distributed network resource provisioning, and that maintain local connection-related information at network nodes. Within the context of this description, the term "GMPLS network" will be used to encompass both packet-switched networks, e.g. those operating using one or more protocols of the MPLS protocol suite to support packet forwarding, and circuit-switched networks, such as WDM-based automatically switched optical networks that employ control-plane signaling between logically adjacent nodes to provide wavelength and/or fiber provisioning according to GMPLS-defined extensions of the MPLS architecture. MPLS and GMPLS network architecture is described in IETF documents RFC 3031 and RFC 3945, which are incorporated herein by reference.

Accordingly, in the example shown in FIG. 1 the nodes 10, 12, 14, and 16 operate as Label Switched Routers ("LSRs") of a GMPLS network, and will be also referred to hereinbelow in this specification as LSRs. The LSRs employ (G)MPLS protocols to facilitate routing of traffic between ingress and egress nodes of respective transmission paths referred herein as Label Switched Paths ("LSPs"). The term "label" is used herein to mean a control-plane identifier of a data plane resource that is provisioned at a node, the node being an LSR, to establish a connection. In the embodiment described herein, the data-plane equipment of LSRs 12 and 14 includes Optical Cross-Connects (OXCs), and labels identify a particular OXC port/DWDM wavelength combination that each of the LSRs 12, 14 have to allocate to provide connections for data traffic through the nodes. Labels are distributed among the LSRs by employing a Label Distribution Protocol ("LDP"), including its extensions such as the constraint based routing LDP ("CR-LDP"). The LDP runs in the control plane 1 of the network, which is physically separate from the data plane 2. In the illustrated example, the control plane runs over an Ethernet network, while the data plane runs over a wavelength routed DWDM network (not illustrated).

By way of example, LSRs 10 and 16 are the ingress node, i.e., the source end, and egress node, i.e. the destination end, of an LSP 30, which traverses nodes 12 and 14. The direction of data traffic from the ingress node 10 toward the egress node 16, which is indicated by the LSP-denoting arrow 30, will be referred to as the downstream direction, and the direction opposite thereto will be referred to as the upstream direction. Accordingly, e.g. node 14 will be referred to as a downstream node relative to the node 12, and as an upstream node relative to the node 16. For the physical link 23, the node 12 is the upstream node, and the node 14 is the downstream node.

Sections of the LSP 30 between adjacent nodes will be referred hereinafter as data links, which are supported by data-plane communication channels between said nodes. In the considered embodiment, a data link e.g. between nodes 12 and 14 corresponds to a particular DWDM channel set-up within a particular optical fiber strand of the physical fiber-optic link 23. In other embodiments, a data link may correspond to a time slot of a TDM system, or to a group of data packets corresponding to a particular forward equivalence class (FEC) of an MPLS packet-switched system. Hereafter in this specification, where it doesn't lead to a confusion, we will be referring to data links between adjacent nodes using reference numerals corresponding to physical links supporting said data links, e.g. we will be referring to a data link of the LSP 30 between the nodes 12 and 14 as the data link 23, and the data link of the LSP 30 between the node 10 and 12 as the data link 21. For a particular node, a data link thereto from an upstream node will be referred to as an incoming data link, and a data link to the downstream node will be referred to as an outgoing data link.

The LDP is responsible for exchanging signalling messages with label information between nodes 10, 12, 14, and 16 to control resource allocation at the nodes for establishing connections between the corresponding data plane equipment to set-up an LSP. Logically adjacent LSRs, such as LSR 12 and LSR 14, communicate via a control-plane communication link therebetween using LDP sessions to establish common label information, which is required for supporting data traffic between the respective LSRs. The term "logically adjacent LSRs" used herein to describe LSRs that exchange label information in an LDP session to provision and setup a data link therebetween; two logically adjacent LSRs may have other intermediate non-MPLS nodes or network elements (NE) in a physical link between them; such nodes or NEs will not be shown in the accompanying drawings. Logically adjacent LSRs, or nodes, maintaining an LDP session therebetween will also be referred to as neighboring LSRs, or nodes, or as peer LSRs or nodes. The control-plane communication link, also referred to as a control link, is a virtual link that is established between peer LSPs in the IP-based signaling communication network (SCN), which operates in the control plane to support control-plane protocols such as the LDP.

Figure 1A:
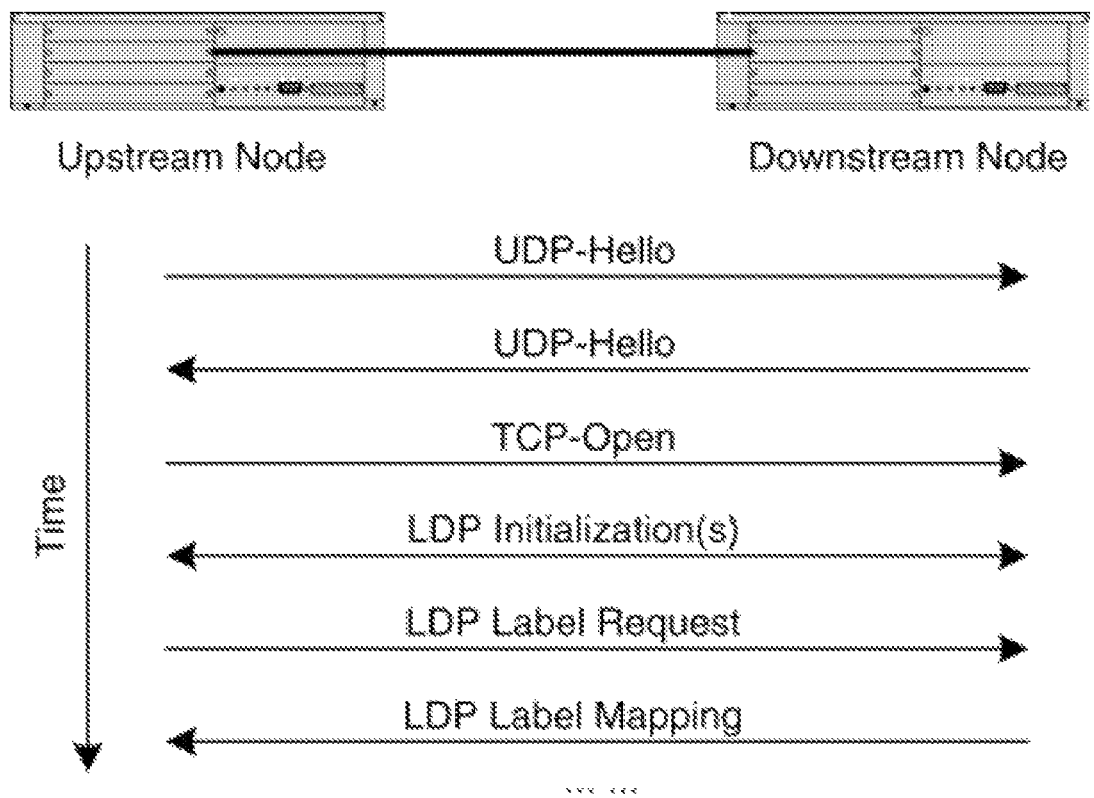
FIG. 1a is a time diagram illustrating prior-art LDP operation.

As illustrated in FIG. 1, label information is exchanged between logically adjacent LSRs in LDP sessions 20, 22, 24. For example, label information is exchanged between LSR 12 and LSR 14 in LDP session 22. Each side of the LDP session uses an LDP entity, which is a software process together with a set of state variables and timers. With reference to FIG. 1a illustrating conventional LDP operation, each LDP session may include a plurality of LDP messages selected from four general types: Discovery messages, Advertisement messages, Session messages, and Notification messages. Discovery messages are used to announce and maintain the presence of a node; they provide a mechanism whereby LSRs indicate their presence in a network, such as by periodically sending a "Hello" message. "Hello" messages are transmitted via UDP to the LDP port at the "all routers on this subnet" group multicast address. An LDP initialization procedure is employed via TCP transport to establish an LDP session with an LSR discovered via a "Hello"-type discovery message. Upon successful completion of the initialization procedure, the two LSRs become LDP peers, and may exchange advertisement messages to set up or tear down connections in the data plane. The status of the connections in the data plane is represented as the label status in the LDP. The LDP advertisement and notification messages are transported over TCP to ensure a reliable and orderly delivery of the messages.

Advertisement messages, such as requesting a label or advertising a label mapping to a peer, are transmitted by an LSR based on local decisions made by that LSR. In general, an LSR requests a label mapping from a neighboring LSR when needed, and advertises a label mapping to a neighboring LSR when it is determined that use of the label by the neighbor may be advantageous. Advertisement messages are employed for the actual exchange of label information; typically, when an LSP has to be set-up, an upstream node sends a label request to its peer downstream node, and said downstream node sends to the upstream node label mapping information. Notification messages are used to notify peer nodes about network events. For example, they are used to signal error information, and to notify peers about newly available/ unavailable channels in the data plane.

The control plane of each LSR maintains connection-related information, e.g. in the form of a label information database (LID) containing information related to labels employed by that LSR. In the illustrated example, LSR 12 includes LID 26, LSR 14 includes LID 28, and LSR 16 includes LID 30. Each LID includes mappings of labels associated with a particular data link between an upstream node and a downstream node. FIG. 1 illustrates a typical LDP embodiment wherein a downstream node maintains the label state information for the respective data link. In a connection setup, e.g. in setting up the data link 23 of the LSP 30, the label state information in the LID 28 is updated when the downstream node 14 assigns a label to the connection corresponding to the data link 23. To set up the connection in the data plane, the upstream node 12 explicitly requests a label from the downstream node 14 in an LDP Label Request message. The downstream node 14 then retrieves information about available channels and/or labels for the incoming data link 23, e.g. available input ports and DWDM wavelengths for the node's OXC. If a channel is available, the downstream node 14 reserves it and assigns a label. By assigning the label to the connection, the label status is changed from "idle", or "unallocated" to "in-use", or "allocated". At the same time, the associated connection information, which is specific to the data plane technology, is stored in the LID 28 in the downstream node. Responding to the LDP Label Request message, the downstream node 14 sends back an LDP Label Mapping message containing the allocated label, or its identifier, to the upstream node 12. After the upstream node 12 receives the LDP Label Mapping message, it can start using the connection corresponding to the indicated label.

In tearing down connections corresponding to the LSP 30, the label state information is updated in a downstream node when the downstream node receives a teardown confirmation from the upstream node. A connection teardown can be initiated by the ingress node 10 or the egress node 16. In the egress-initiated teardown, the egress node 16 sends, within the LDP session 24, an LDP Label Withdraw message to its upstream peer node 14. If the upstream node 14 decides to tear down that connection, it sends back an LDP Label Release message and stops using that connection. Upon receiving that LDP Label Release message, the egress node 16 updates the label state to "idle" and stops using that connection. Each of the LDP sessions 22 and 20 repeats this procedure in the upstream direction, updating the status of labels associated with the data links 23 and 21 to "idle". When the ingress node 10 wants to tear down an established connection, it first sends an LDP notification message to the egress node 16 so that no loss of signal error will be triggered at the egress node 16. Then the aforedescribed procedure used in the egress-initiated teardown is applied.

The label state information that is stored in a LID includes connection status information, e.g. a status parameter for each configured, or valid label in a label space of the associated LSR; this status information indicates whether a particular label or range of labels is allocated to a provisioned connection or an LSP, or is not allocated to any of the provisioned connections, and is therefore available for setting up new LSPs and new connections. In a preferred embodiment, the status parameter of a valid label can have one of the following four values, or their equivalents: "idle" i.e., free or unallocated to any connection, "presumably idle", "in-use", or allocated to a connection, and "reserved", or "pending"; the later may for example indicate a transient state assigned to a label by an LDP entity at a downstream node after receiving an LDP label request message from the upstream peer node, but before replying to said upstream node with a label mapping message.

The term "label space" is used herein to mean a plurality of all labels that are, or could potentially be available for connection allocation by a particular node; label space represents a plurality of all configured channels in the data plane, for example—all DWDM channels that can be routed by an OXC in an embodiment wherein the data plane equipment of the respective node includes the OXC. The label space information can therefore be a part of a general configuration information for the node which is available to the LDP. Alternatively, a separate label space can be used for each physical link. Different label spaces may use the same label value for different purposes.

Together with the label status, the LID also stores additional label-related information, which is specific to the data plane technology. For example, in an MPLS packet-switched network the label-related information may include an identifier of a Forwarding Equivalence Class (FEC), information about label operation to be performed at a downstream LSR, e.g., label swapping or label stack push/pop operation, a link layer format for an incoming link, etc; particular information to be stored in the LID depends on particular data-plane and control-plane implementation and would be known to those skilled in the art. In a GMPLS-controlled Wavelength Division Multiplexing (WDM) network, such label-related information may include: network identifiers for the ingress and egress nodes of the respective LSP, information related to an implemented protection scheme in the data plane, wavelength operation provisioned at a downstream node, such as add/ drop operation, wavelength conversion, optical to electrical conversion, etc. Details of possible connection related information that can be stored in a LID of a GMPLS network are described in a published IETF document entitled "Generalized Multiprotocol Label Switching (GMPLS) Label Switching Router (LSR) Management Information Base," February 2005, IETF draft by T. Nadeau and A. Farrel (Ed.), which is available for download from the IETF website.

The connection-related information stored in a LID of a network node is used by the node to set-up, maintain and tear-up the network connections provided by the node. However, an interruption in the control plane of the network, for example a failure in a control-plane link between two nodes, a failure or a maintenance-related shutdown in the control plane equipment of one of the two nodes, may disrupt the LDP session between the two nodes, resulting in a loss of all or part of the LID information maintained by the affected node, or the LID information becoming unreliable after the LDP session restart. The present invention provides a method, device and system for facilitating a fast recovery from such an interruption in the control plane of the communication network. Embodiments of the invention will now be described with reference to FIGS. 2-9.

Figure 2:
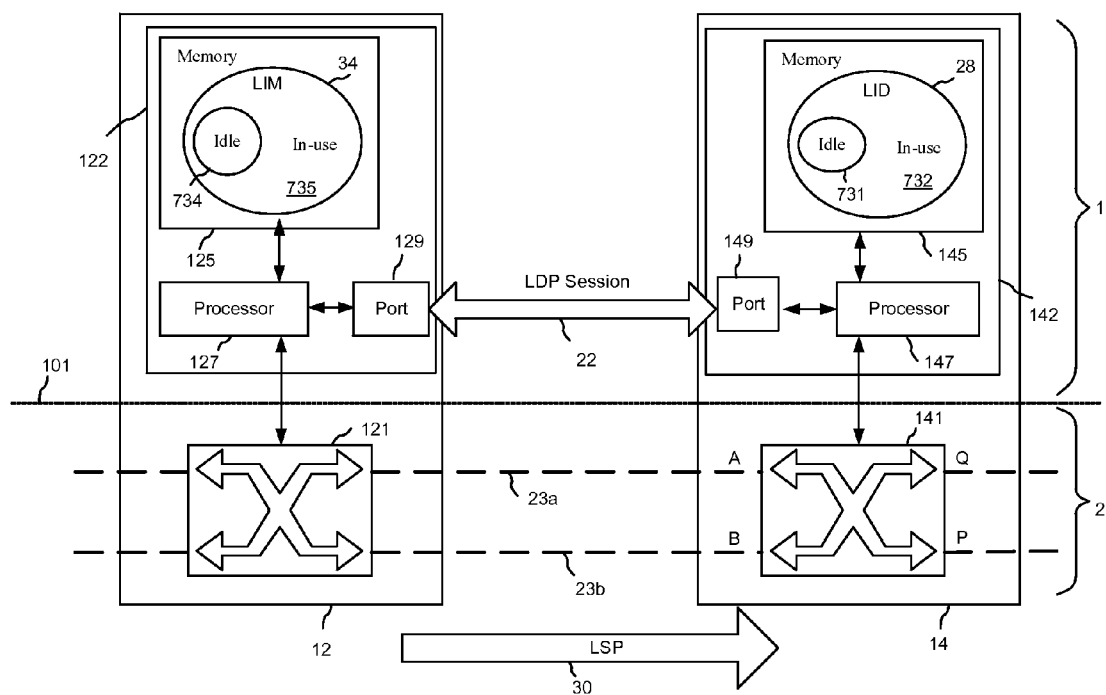
FIG. 2 is a diagram showing adjacent nodes of a communication network according to the invention.

FIG. 2 schematically presents a device-oriented view of a portion of the network shown in FIG. 1 that includes nodes 12 and 14 having features of the present invention. Data plane equipment of the nodes 12 and 14 is shown below the dotted line 101, and includes OXCs 121 and 141, each in this particular example having two input and two output fiber ports. Input and output ports of the downstream OXC 141 are labelled with literals "A", "B" and "P", "Q", respectively. The OXCs 121 and 141 are connected via the physical link 23 which includes two optical fiber strands 23a and 23b linking respective output and input fiber ports of the OXCs 121 and 141, which are operative to selectively route one or more (D)WDM channels from any one of the input ports to any one of the output ports of the respective OXC.

The control plane equipment of the nodes includes control means 122 and 142, hereinafter also referred to as node controllers, controllers, or control devices. The control means 142 will also be referred hereinafter as the first control means, or the first controller, and the control means 122 will also be referred as the second control means, or the second controller. The terms "controller", "control device", or "device" are used herein interchangeably to mean a logical entity that may include a collection of hardware with associated software instructions for cooperatively performing one or more unified control functions in the network; depending on implementation, control devices 122 and 142 may be each realized in a variety of forms, for example as a single card, a portion of a card, or can be spread over two or more cards located in one or more racks of the network node equipment. Also in the following description in the context of control plane operations the terms "node" and "control node" will be used to mean the control means of the node.

The controllers 122 and 142 include memory portions 125 and 145, respectively, that are coupled to respective processing means 127 and 147 of the controllers 122 and 142. Each of the memory portions 125 and 145 can be embodied using one or more separate memory modules of suitable type. Similarly, each of the processing means 127 and 147, hereinafter also referred to as processors, can be embodied using one or more types of modules or elements capable of data processing, including network cards, ASICS, general purpose processors, microprocessors, and FPGAs. The controllers 122 and 142 also include communication ports 129 and 149 for establishing and maintaining a control-plane communication link, such as an Ethernet link, between the nodes 12 and 14 for exchanging control plane messages, e.g. using the LDP. A control link is not necessarily a physical link, in a preferred embodiment the link is enabled by TCP/UDP messages transported over IP protocol via, e.g., a network connection between the first and second controllers. Particulars of hardware and software implementation of the control plane equipment of a (G)MPLS network would be known to those skilled in the art from the general knowledge of the art and the present description. In operation, the processors 127 and 147 execute one or more software applications supporting various control-plane protocols, that may include one or more routing protocols and one or more signalling protocols, such as the LDP. For example, the processor 147 may execute an LDP application for exchanging control-plane signalling messages as described hereinabove and for supporting the LDP session 22 with the upstream node controller 122, and a proprietary software application for allocating data-plane connections to data traffic in communication with the LDP application and the OXC 141. Responsive to LDP messages received from the upstream peer node 12, the processor 147 executes instructions for maintaining the connection-related or label-related information in the form of the LID 28, said information being stored in the memory 145 coupled with the processor 147.

When a control plane failure occurs affecting either the control link between nodes 12 and 14 or the control plane of the node 14 itself, the LDP session 22 closes, leading to an interruption in control-plane communication between nodes 12 and 14. Alternatively, such an interruption may be caused by a local control plane shutdown, e.g. for maintenance and upgrade. A new LDP session has to be started after the failure is repaired, or the maintenance procedure is finished. However, the failure and/or the LDP session shutdown may compromise the connection related information stored in the LID 28, requiring a control plane recovery procedure to be performed before node 14 can be declared fully operational, otherwise existing connections could be compromised by attempting to perform any connection changes. Prior art solution for control plane recovery required that the connection-related information stored in the LID 28 be fully restored before the control plane of the node 14 is fully operational, so to avoid disrupting existing connections by accidental assigning in-use channels to new connections.

The full LID recovery may however take a relatively long time due to a large amount of the connection-related information that can be stored in the LID. The present invention enables to considerably reduce this time delay before the control node is operational, by taking advantage of the fact that new connection provisioning does not require the full LID information restore, but only a relatively small portion of the connection-related information stored in the LID, namely—information indicating unallocated, or idle, labels, i.e. labels that are associated with configured, but currently un-allocated data transmission channels of the node data-plane equipment. For convenience of the description, this portion of the label-related information stored in a LID will be referred to hereinafter as the first information, while information related to allocated, or "in-use" labels/connections will be referred to as the second information. These portions of the connection-related information stored in the LID 28 are schematically indicated with reference numerals 731 and 732. In most cases, the first information that simply indicates which labels from the node label space are free, constitutes only a small portion of the LID 28 information content, and thus requires less memory and can be transmitted faster than the whole connection-related information stored in the LID 28.

Figure 3:
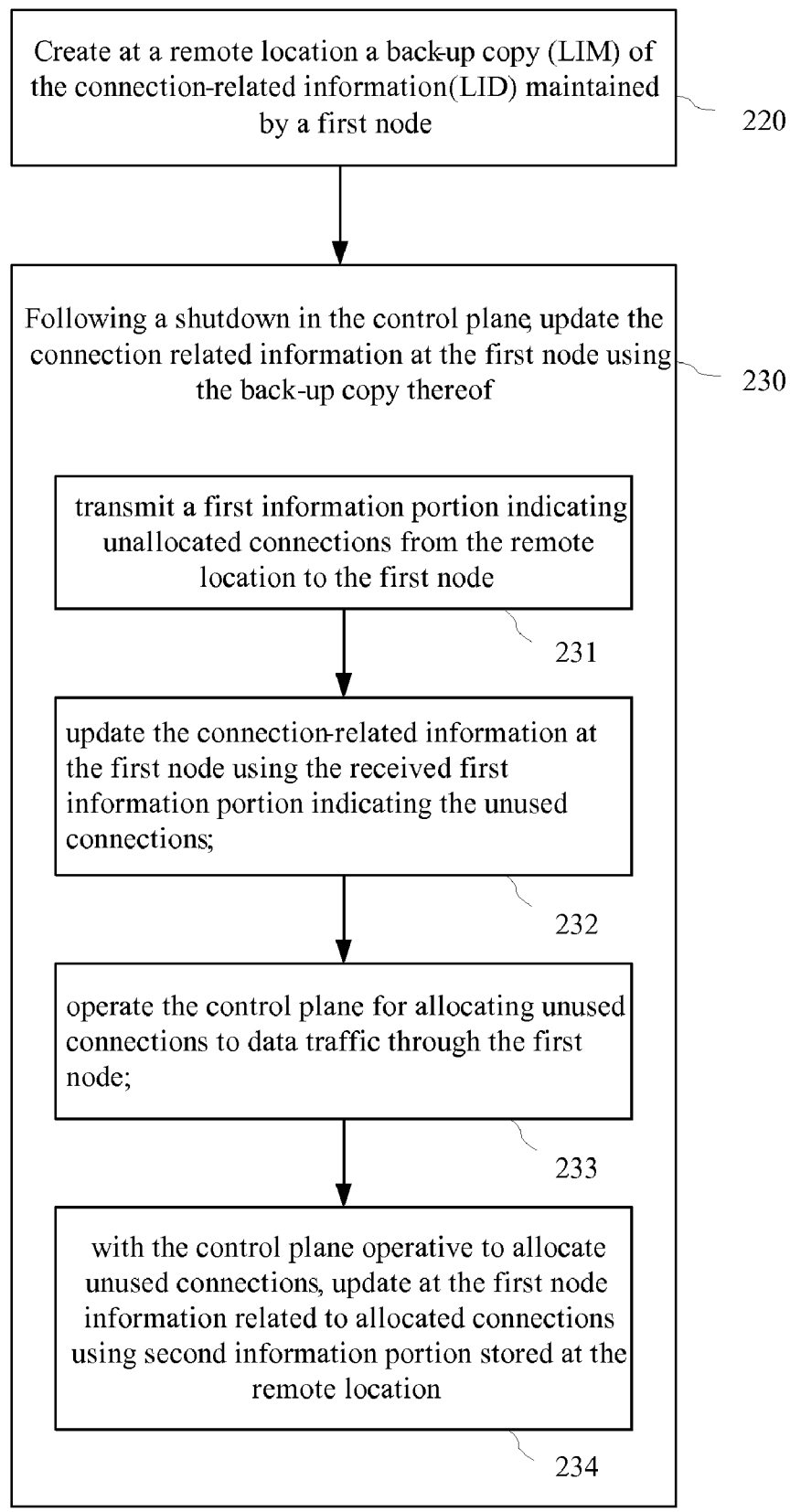
FIG. 3 is a chart illustrating general steps of the control plane recovery method of the present invention.

With reference to FIG. 3, the method of the present invention for operating the control plane of the communication network illustrated in FIG. 2 so to facilitate control plane recovery includes the following general steps:

In a first step 220, a back-up copy of the connection-related information maintained by the control plane of node 14 is created at a remote location. Referring back to FIG. 2, in a preferred embodiment the remote location is the control plane device 122 of the peer upstream node 12, wherein a copy of the LID 28, which is stored in the memory 14 of the control plane device 142 of the node 14, is created. This copy 34 is referred to hereinafter as the Label Information Mirror (LIM), and is stored in the memory 125 of the controller 122. In one embodiment, information content of the LIM 34 consists of a copy 734 of the first information 731, and a copy 735 of the second information 732. In one embodiment, the process of creating the LIM 34 includes an initialization procedure, and a LIM-LID synchronization procedure, which employs the LDP session 22 for transmitting, prior to the failure event, the label-related information stored in the LID 28 to the controller 122, as described hereinbelow.

Figure 4:
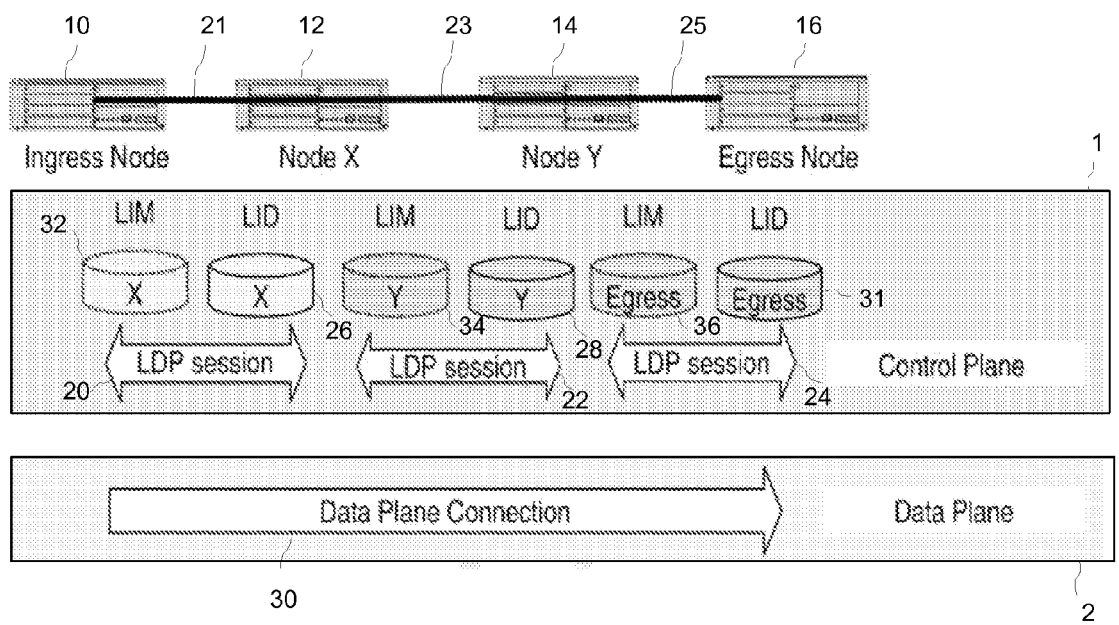
FIG. 4 is a diagram illustrating a portion of a (G)MPLS network including a plurality of LSRs having label information mirrors.

Creating a copy of the connection-related information maintained by a node at its respective upstream peer node facilitates distributed control plane recovery after a single-point control-plane interruption associated with said network node. With reference to FIG. 4, in one embodiment of the invention the Label information Mirrors ("LIMs") 32, 34, 36 are created in upstream LSRs 10, 12 and 14 of the links 21, 23 and 25 respectively to facilitate LDP recovery in the event of control plane failures. Each LIM contains a copy of a label information database maintained by a logically adjacent downstream LSR, and is populated using an LDP session between said LSRs. For example, LIM 32 in LSR 10 contains the label information from database 26, LIM 34 in LSR 12 contains the label information from database 28, and LIM 36 in LSR 14 contains the label information from database 31. The LIMs may be employed to restore label information that is lost or corrupted in the corresponding label information database. In the embodiments wherein labels are local to the link they refer to, each LID and its associated LIM store only information related to labels associated with a specific link or a specific node. For example, the LID-LIM pair 26, 32 contains connection information related to the link 21 and to the associated resources provided by the node 12. The LID-LIM pair 28, 34 contains connection-related information related to the link 23 and to the associated resources provided by the node 14, and the LID-LIM pair 31, 36 contains connection-related information related to the link 25 and the associated resources provided by the node 16. This distributed mirroring of connection-related information associated with each LSP in a network makes the recovery mechanism of the present invention scalable, and enables it to be deployed on a per LDP session basis.

Following an interruption in control plane communications between the nodes 12 and 14, the connection-related information at the first node 14, i.e. the LID 28, is updated in two steps using the back-up copy thereof, i.e. the LIM, stored by the device 122. In the embodiment considered herein, the LDP session is used to populate the LID 28 with label related information, and the process of updating the LID 28 can also be referred to as the LDP state recovery. According to the present invention, this LDP state recovery, which in FIG. 3 is schematically shown as a functional block 230, is performed in two general steps: in a first general step, which will be referred to hereinafter as the coarse recovery, only the first information portion 731 is updated using the copy of this information 734 from the LIM 34; this first information portion 731 preferably includes only the information indicating the idle, or un-allocated connections/labels for the node 14; this step of the coarse LDP state recovery is followed by a detailed recovery, wherein the second information 732 stored in the LID 28 is updated with information related to in-use, or allocated connections, using the information 735 stored in LIM 34. Contrary to the prior art, the control plane of the node 14, i.e. the controller 142, becomes operational after the coarse recovery step is complete, so that the step of detailed LDP state recovery is performed in parallel with normal operation of the control plane of the node 14 including the LDP.

Turning back to FIG. 3, the method of the present invention for the control plane recovery generally includes:

in a step 231, transmitting the copy 734 of the first information from the second controller 122 to the first controller 142;

in a step 232, receiving the copy 734 of the first information at the first controller 142, and updating therewith the first information 731 related to unused connections;

in a step 233, restarting normal operation of the control plane 1 for allocating unused connections to data traffic through the first node 14 by the first controller 142; and, in a step 234, with the control plane 1 operative to allocate unused connections, updating, at the first controller 142, the second information 732 using a copy 735 of the second information stored at the second controller 122.

Accordingly, in a preferred embodiment of the invention the processor 147 of the control device 142 of the present invention is operative to perform the following functions: i) send the label information via the port 149 to the controller 122 of the second node 12 for storing therein; ii) receive a copy of the first information 734 from the second node 12 following an interruption in communication with the second node 12; iii) update the first information 731 stored in the memory 145 using the copy 734 of the first information received from the control means 122 controlling the second node 12; and, iv) responsive to a label allocation request, execute a software application for allocating the label to a connection using the updated first information 731 prior to receiving a copy 735 of the second information.

Advantageously, the LDP recovery method of the present invention includes a synchronization procedure for the label state information redundantly stored in the peer nodes, and the two-step recovery procedure: i) a fast and coarse LDP state information recovery during the initialization of a restarting LDP session; and ii) a detailed LDP state information recovery running in parallel to the normal LDP operations.

The method of the present invention for operation of the control plane 1 will now be described in further detail in one embodiment thereof, along with the apparatus 142 for implementing said method.

The LIMs are initialized contemporaneous with LDP session initiation. In this embodiment, four novel Type-Length-Value objects (TLVs) are defined in the invention for the LDP session initialization message: LIM, LID, Recovery (Rcvy) and Cork TLVs. An upstream node uses the LIM TLV to notify its downstream peer node about the idle labels in a LIM. A downstream node uses the LID TLV to notify its upstream node about the idle labels in a LID. The idle labels can be enumerated as individual labels, or as groups of consecutive labels by specifying the boundaries of the label groups, or as a combination of the former two types. The Rcvy TLV is a flag to indicate to a node's LDP peer whether the node intends to conduct the proposed LDP recovery. By default, an LDP session initialization message should include the Rcvy flag. However, the network management system or an operator can overwrite such default by excluding the Rcvy TLV from the LDP initialization message, so that the operation of the proposed LDP recovery is disabled. Examples of such occasions include a "cold" LDP initialization where the LDP recovery is unnecessary, simultaneous failure of two adjacent nodes where the label state information is completely lost. The Cork TLV is a flag to indicate the end of sending a complete list of idle labels in a LIM or LID, since the transfer of a complete list can be split into multiple LIM or LID TLVs.

Figure 5:
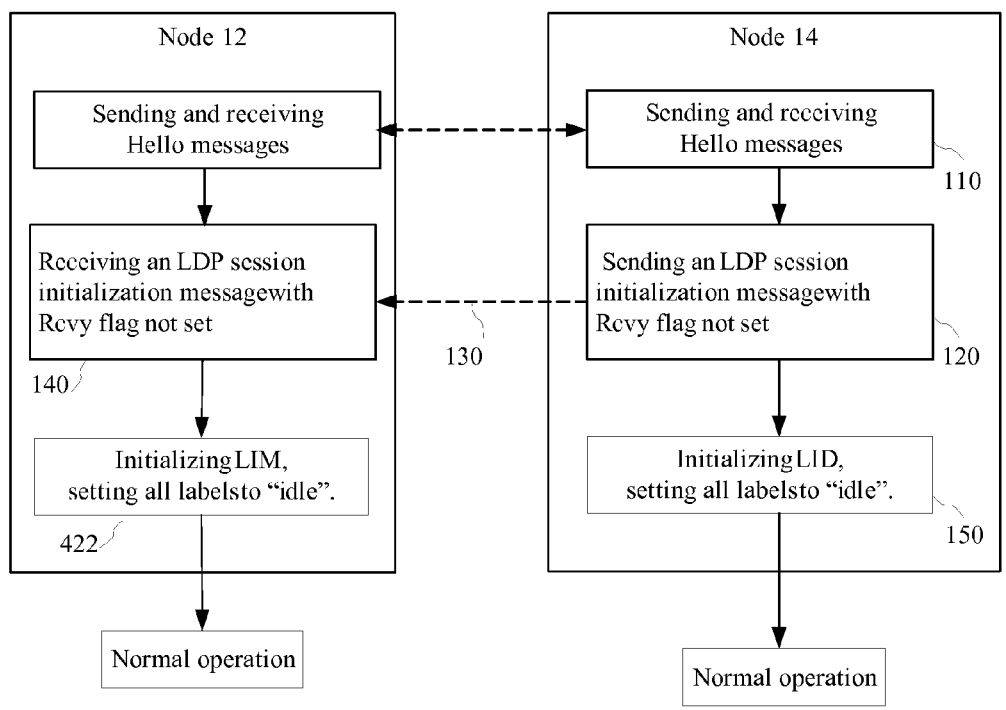
FIG. 5 is a chart illustrating LDP initialization after a failure event.

In one embodiment, the method starts with the "cold" LDP initialization phase, when no connections is yet provisioned; this procedure is illustrated in FIG. 5. During the "cold" initialization phase of an LDP session, i.e., initialization from "scratch", the LIM 34 and its corresponding LID 28 are initialized based on the actual channel configuration in the data plane of the node 14, which defines the label space. In one embodiment, the "cold" channel initialization procedure is as follows. First, in step 110 the node controllers exchange UDP "HELLO" messages to establish a communication link therebetween; then in step 120 one of the nodes, in the shown example—node 14 sends, and in step 140 the other node, e.g. node 12, receives an LDP session initialization message without the Rcvy TLV indicating that the recovery procedure is not to be conducted. After receiving the LDP session initialization message, in step 422 the node 12 controller initializes the LIM 34, setting all labels to "idle", while the node 14 controller in step 150 initializes the LID 28, setting all labels to "idle"; this completes the initialization procedure for the LDP session 22, bringing it to an operation state.

As a result, the LIM 34 and its corresponding LID 28 initially have identical contents, where all configured labels have the idle state. In operation, their contents are synchronized as follows. When LSR 14 assigns a label, upstream LSR 12 updates its corresponding LIM 34 after receiving an LDP Label Mapping message from the downstream LSR peer 14. Consequently, both the LIM 34 and the LID 28 are synchronized after the LSP setting up phase. In the LSP tearing down phase, the upstream LSR 12 updates its LIM 34 when it sends an LDP Label Release message to the downstream LSR peer 14. In this way, both the LIM 34 and the LID 28 are synchronizes after the LSP tearing down phase. The upstream LSR 12 also maintains the LIM 34 when it receives an LDP Notification message from the downstream LSR peer 14. Consequently, in any stable state of the LDP operation, the LIM 34 and the LID 28 are synchronized.

Figure 6:
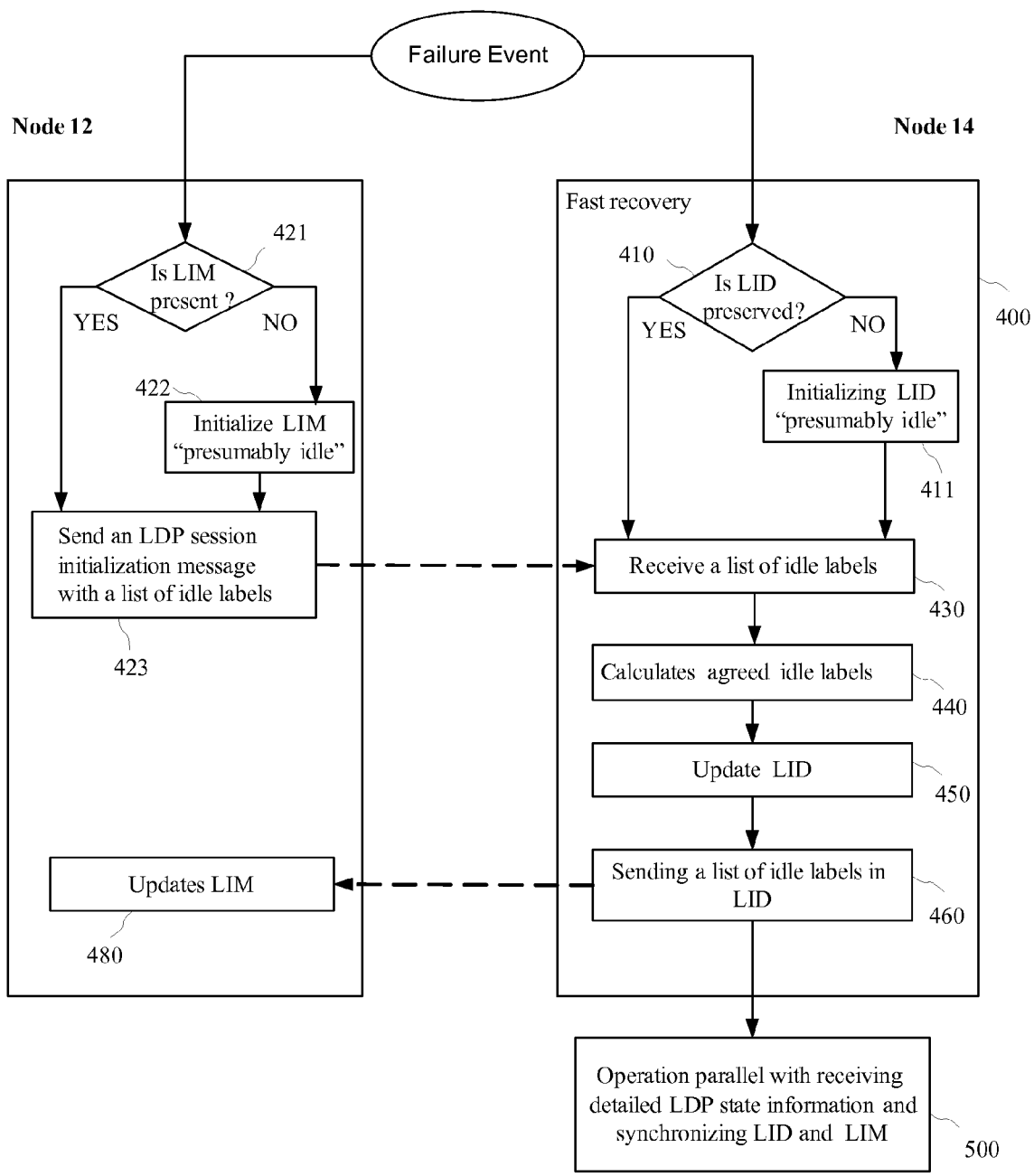
FIG. 6 is a chart illustrating steps of the coarse LDP recovery after a failure event.
Figure 7:
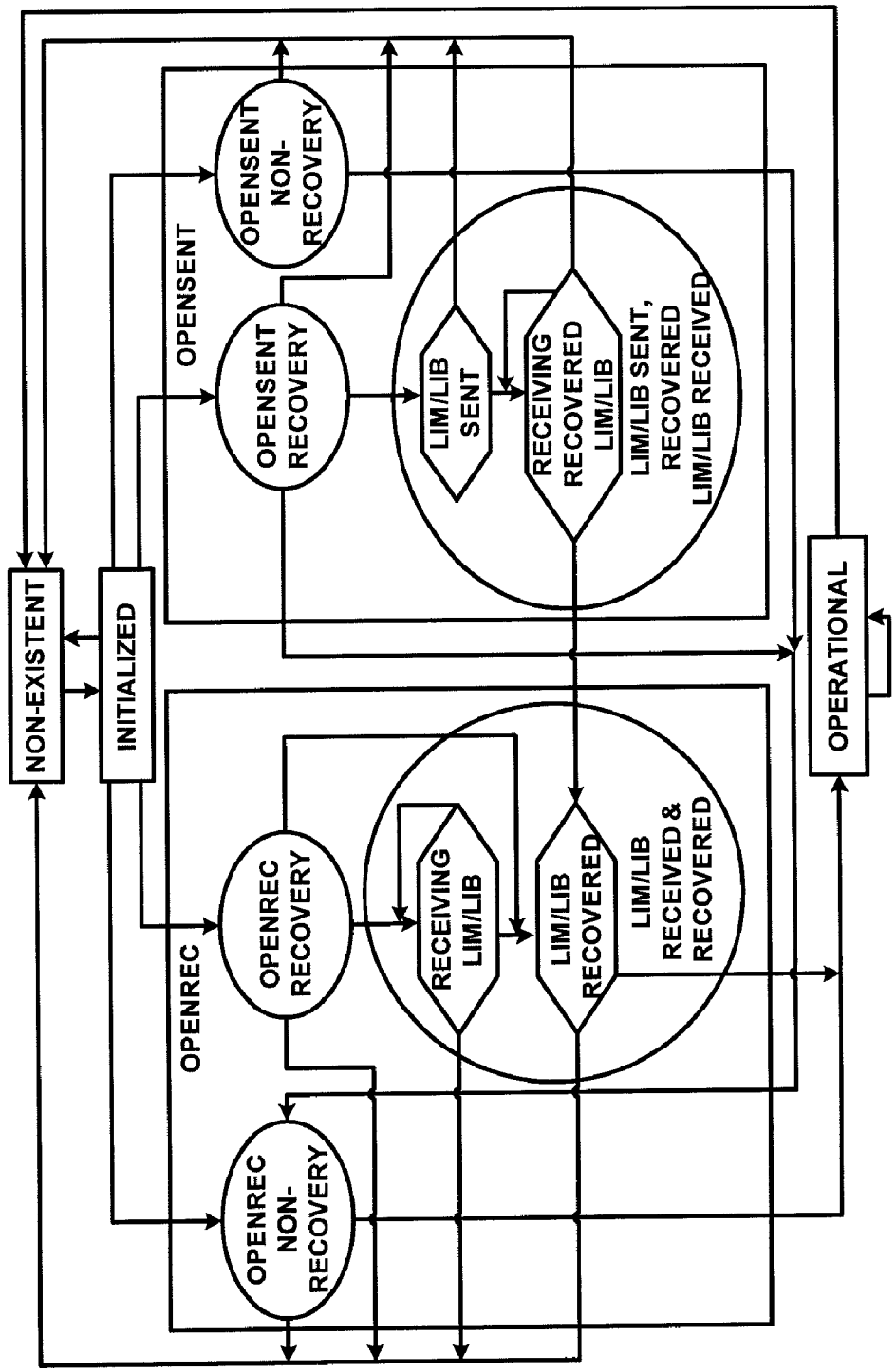
FIG. 7 is a diagram showing an LDP state machine diagram for the coarse LDP state information recovery.

After the control plane interruption that affects either the control link between the nodes 12 and 14, or the node 14 itself, the LDP session 22 closes. When the failure is repaired, the LDP application is re-started, a new LDP session initiated, and the coarse LDP state recovery is performed, e.g. as shown in FIG. 6. For certainty, the description below assumes that the upstream node 12 plays the active role in the LDP initialization, which may happen e.g. if the upstream node 12 has a higher IP address for the LDP session than the downstream node 14. However, similar procedure can be applied when the downstream node 14 plays the active role in the LDP initialization, as would be obvious to one skilled in the art.

In steps 410 and 421 nodes 14 and 12 verify if LID 28 is preserved, and if LIM 34 is present. Depending on the results, the downstream node 14 attempts to restore its LID for the incoming link. If the label state information is preserved, it keeps the restored LID. In some embodiments, the data plane equipment, e.g. the OXC 141, may be capable of providing to the node controller 142 information regarding its actual connection configuration; in this embodiment, this information can be used to at least partially restore the LID maintained by the node controller. Otherwise, in step 411 the downstream node 14 sets the state of all labels to "presumably idle". Similarly, if the LIM 34 is not preserved, the upstream node 12 initializes the LIM 34 in step 422 by setting the state of all labels to "presumably idle".

Then in step 423 the upstream node 12 advises the downstream node about the idle labels in its LIM 34 by sending one or more LIM TLVs in an LDP session initialization message with the Rcvy flag set, i.e. indicating that the LDP state recovery is to be performed.

In step 430, the downstream node 14 receives the list of idle labels. After receiving information about all the idle labels from the upstream node LIM 34, in step 440 the controller 142 of the downstream node 14 processes the information to determine which labels are to be set as "idle" in the LID 28; in the preferred embodiment, the new list of idle labels is determined as the labels having the "idle" (or "presumably idle") status according to both the LIM 34 and the LID 28. In other words, in this embodiment, the LID 28 is updated with an intersection of the received copy 734 of the first information, and the first information 731 that was stored in the LID 28 of the node 14.

In step 450, the downstream node 14 updates its LID 28 by changing the status of the labels calculated in the previous step to idle. In other words, in this embodiment, the LID 28 is updated with an intersection of the received copy 734 of the first information, and the first information 731 that was stored in the LID 28 of the node 14. If a label's state in LID 28 is "presumably idle", the state designation is set as 'unknown'.

In step 460, the downstream node 14 sends the idle labels back to the upstream node 12 that are encoded in one or more LID TLVs. After this step, the node 14 becomes operational, and can begin the detailed recovery procedure 500 in the background.

In step 480, the upstream node 12 updates its LIM 34 by changing the status of the labels matching the received idle labels to idle. If a label's state is "presumably idle", the state is changed to unknown.

Using the aforedescribed fast LDP state information recovery, a control node recovers its information about which labels were idle before a failure. In the preferred embodiment, the control node conservatively decides that a label is idle, since only when both upstream and downstream nodes agree that a label is idle, the label is considered as idle. If the upstream and downstream nodes disagree on the state of a label, the label state is considered as unknown and will be further investigated in the next LDP recovery step—the detailed LDP state information recovery. Advantageously, the coarse LDP state information recovery of the present invention enables first to quickly recover basic label state, i.e., in-use or idle, so that the LDP session can enter the operational state to handle new connection setup requests without interfering with existing connections. The detailed label-related information and unknown state labels are left for the detailed LDP state information recovery. In a further advantage, this recovery procedure is independent of the control plane failure type, and handles a control channel or a control node failure in a unified manner.

The fast LDP state information recovery procedure of the present invention is an extension of the standard LDP initialization procedure. The state machine specification for it is given in FIG. 7, wherein the following notations are used: A rectangular block represents a major state. An arrow from a state to another represents a state transition, where the condition of the transition is specified as the first half notation beside the arrow, and before a slash mark "/"; actions performed after the transition are specified as the second half notation. An elliptical block is a sub-state within a major state. A hexagonal block within an elliptical block represents a micro-state. In the diagram, "Rx" denotes "receive", "Tx" denotes "transmit", "msg" denotes "message", and "init" denotes "initialization".

The following description provides an example of the coarse LDP state recovery in a GMPLS-controlled WDM optical network. In this example, the recovery method of the present invention will be illustrated with reference to FIG. 2 showing the portion of said network wherein the LDP session 22 between nodes 12 and 14 had to be re-started after a failure and replacement of node 14.

Before the failure event, the LIM 34 at node 12 and the LID 28 at node 14 had been synchronized as described hereinabove, and their contents were substantially identical. By way of example, Table 1 provides a snapshot of a portion of the LIM 34 and LID 28 contents at the moment before the failure of node 14.

message that includes one or more LIM TLVs with a list of idle labels according to the information stored in the LIM 34 of node 12. The list contains tuplets of the form (port/fibre ID, wavelength channel ID), namely the tuplets (A,1) and (B,1);

3) the LID 28 is updated according to the received list of 'idle' labels, so that the status of labels (A,1) and (B,1) is changed to 'idle', while the status of labels (A,2) and (B,2) is changed to unknown;

TABLE 1

Contents of the LIM in node 12 and the LID in node 14 before a failure of node 14

| Port/Fibre ID | Wavelength Channel ID | Status | Operations at Node 14 | Connection ID | ... |
|---|---|---|---|---|---|
| A | 1 | Idle | None | | |
| A | 2 | In-use | Cross-connect to Output Port P, Wavelength Channel 2 | Ingress Node: Connection number 3 | |
| B | 1 | Idle | None | | |
| B | 2 | In-use | Cross-connect to Output Port Q, Wavelength Channel 2 | Ingress Node: Connection number 5 | |

In this example, a connection at node 14 for an incoming data link from node 12 is identified by an input port of the OXC 141 and the wavelength channel number; in this example, the OXC 141 is configured to support at least two (D)WDM channels. After the controller 142 of the node 14 is replaced and suitably configured, it starts the LDP application and re-establishes an LDP session with the node 12. The LDP configuration for the new node controller 142 must be the same as the failed control node; any change in the LDP configuration is detected by the network management system and may result in disabling the automatic LDP recovery. During the control plane failure, no managed connection setup or teardown is possible because the LDP signalling protocol is not functional; therefore, the state of the data plane connections is assumed to remain unchanged.

For clarity of the description, we assume that node 12 plays the active role in the LDP session initialization. Assuming that no LDP state information is preserved after the failure, the processor 147 executes instructions for performing the coarse LDP state information recovery procedure that is described below.

1) A new instance of the LID 28 is created and initialized, setting all labels to "presumably idle". The content of the LID is illustrated in Table 2;

4) labels that the LID 28 lists as 'idle', i.e. labels (A,1) and (B,1), are sent to the node 12's controller 122.

The controller 122 of the upstream node 12 updates the status of labels (A,1) and (B,1) in the LIM 34 to 'idle'. There is no state change for labels (A,2) and (B,2).

The aforedescribed steps (1)-(4) result in a partial recovery of the LID 28 and its synchronization with the LIM 34, with their content shown in Table 3. After the coarse procedure is complete, the new LDP session 22 enters its operational state, wherein the node 14 controller 142 can accept and process label requests for establishing new data-plane connections.

In the background, the LDP session continues the detailed LDP state information recovery, and the controller 142 of node 14 gradually recovers the portion of the LDP state information that remains unknown by querying the controller of node 12, which replies to the queries by sending the backup LDP state information stored in the LIM 34 to node 14. While the detailed LDP state information recovery is ongoing, the new LDP session 22 may process connection teardown requests. If a such a request requires the LDP state information that has not been recovered yet, an on-demand query is to be conducted. Similarly, an LDP session between node 14 and

TABLE 2

CONTENTS OF THE LID IN NODE 14 AFTER A REPLACEMENT OF THE CONTROL NODE OF NODE 142

| Port/Fibre ID | Wavelength Channel ID | Status | Operations at Node X | Connection ID | ... |
|---|---|---|---|---|---|
| A | 1 | Presumably idle | Unknown | Unknown | Unknown |
| A | 2 | Presumably idle | Unknown | Unknown | Unknown |
| B | 1 | Presumably idle | Unknown | Unknown | Unknown |
| B | 2 | Presumably idle | Unknown | Unknown | Unknown |

2) after re-establishing a communication link with the node 12 controller, e.g. by exchanging UDP "HELLO" messages, the controller 147 receives therefrom an LDP initialization its downstream node 16 can be used to recover portion of the information content of the LID 28 by querying the downstream node controller.

TABLE 3

CONTENTS OF THE LID IN NODE 14 AFTER THE FAST LDP STATE
INFORMATION RECOVERY

| Port/Fibre ID | Wavelength Channel ID | Status | Operations at Node X | Connection ID | ... |
|---|---|---|---|---|---|
| A | 1 | Idle | Unknown | Unknown | Unknown |
| A | 2 | Unknown | Unknown | Unknown | Unknown |
| B | 1 | Idle | Unknown | Unknown | Unknown |
| B | 2 | Unknown | Unknown | Unknown | Unknown |

A preferred procedure for the detailed LDP state information recovery is based on a query-and-reply approach, and is an extension of a prior-art LDP query procedure described by P. Ashwood-Smith, A. Paraschiv and D. Allan, in "Multi Protocol Label Switching Label Distribution Protocol Query Message Description," IETF draft 'draft-ietf-mpls-lsp-query-09.txt', June 2003.

In the prior art, an LDP Query message is used to gather a particular connection's information, e.g., labels used at each data link along an LSP. The method of the present invention extends the LDP query by allowing a Query message to be propagated in either the upstream or downstream direction, enabling an intermediate control node, e.g. the controller 142 of the node 14, to query both the upstream and downstream directions, and enabling a wide range of label-related information to be queried. With these extensions, an upstream node, e.g. node 12, may recover the detailed LDP state information in its LIM 34 by querying its downstream node 14. A downstream node may use the same procedure to recover the detailed LDP state information in its LID by querying its upstream node.

Figure 8:
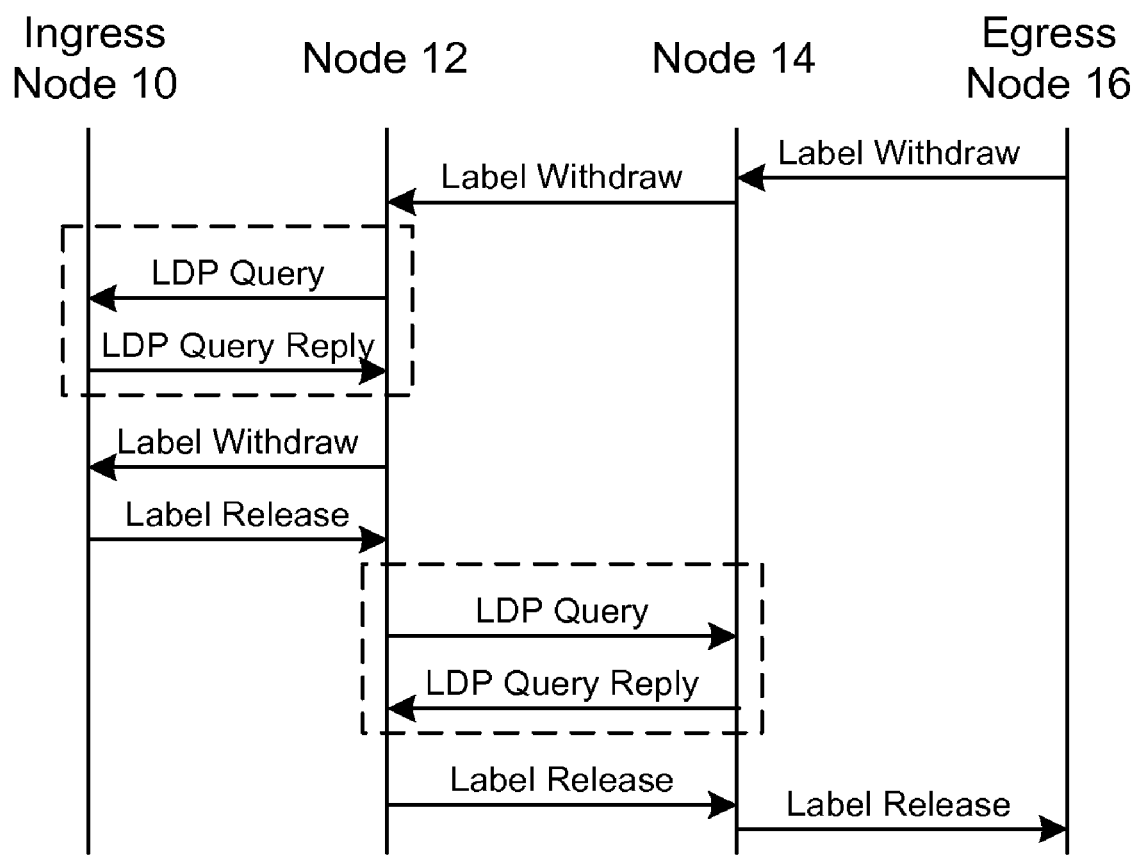
FIG. 8 is a time diagram illustrating label querying during the detailed LDP information recovery triggered by a connection teardown.

In the preferred embodiment of the invention, the detailed LDP state information recovery operates on a per label basis and in parallel to the normal LDP operation such as setting up or tearing down connections. When certain detailed LDP state information is required in the replaced node, the node queries its peers to recover the information. The labels can be queried in any sequence. When a normal LDP operation requires a label's state information that has not been recovered or queried yet, a query about the label is sent immediately. In FIG. 8, a connection teardown for the LSP 30 has been initiated by the egress node 16 while the connection information stored at node 12 has not been yet fully recovered after a control plane failure associated with that node, and after the coarse LDP state recovery at node 12. The node 12 controller receives a label withdrawal message from node 14, which triggers an on-demand detailed LDP state information recovery related to the particular label to be withdrawn.

Figure 9:
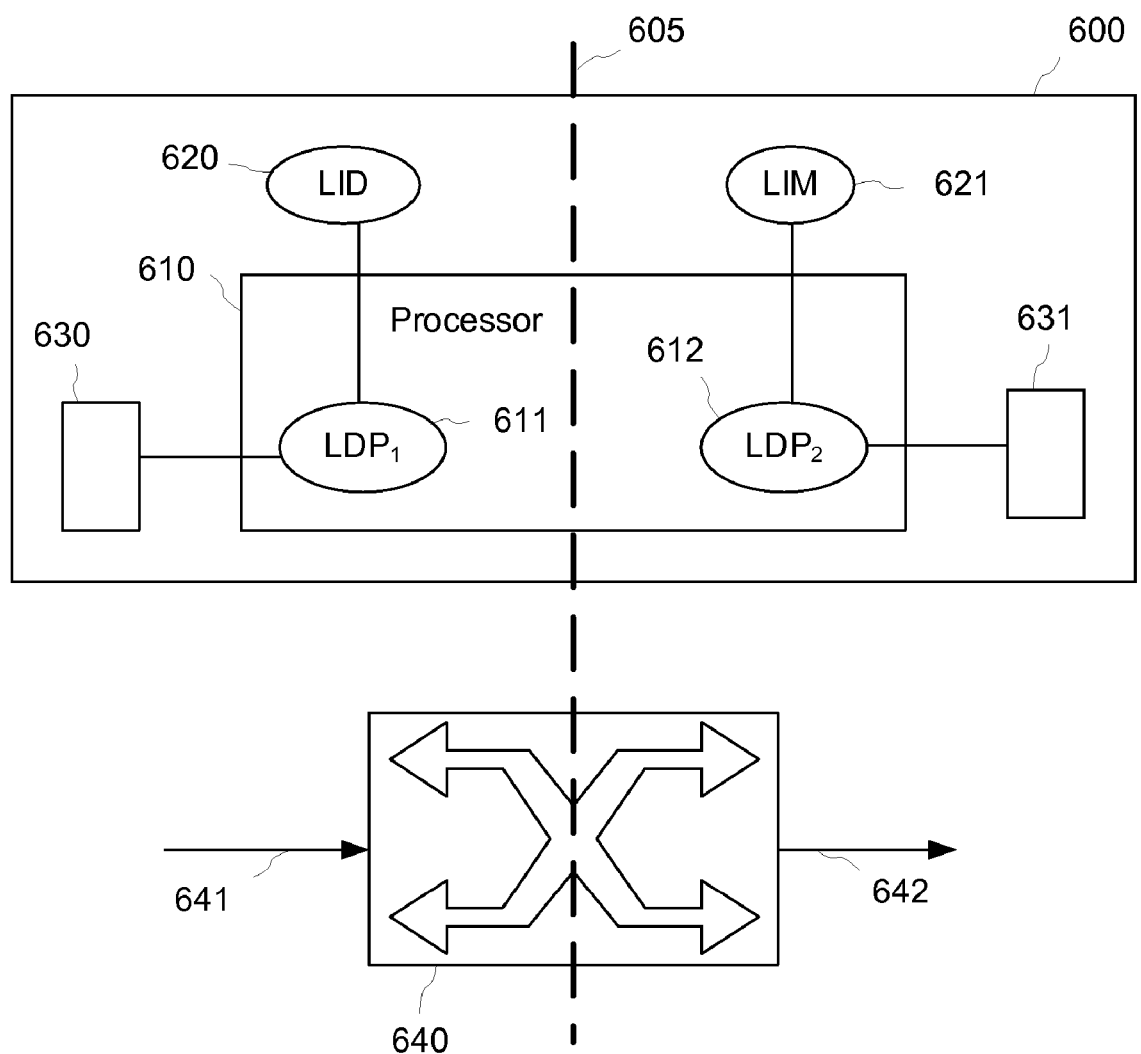
FIG. 9 is a diagram of one network node with a control plane having a downstream side LID and an upstream-side LIM.

FIG. 9 illustrates an intermediate node, or an LSR, similar to node 14 shown in FIG. 2, of a GMPLS (D)WDM optical network in greater detail. The node includes a node controller 600 embodying the control plane of the node, and an OXC 640 in the data plane of the node. A dashed line 605 illustrates a logical division of the node equipment on the downstream-side to the left, and the up-stream side to the right. The controller 600 has communication ports 630 and 631 for exchanging control plane messages with controllers of upstream and downstream nodes, respectively, and communicates with the data plane equipment using a control interface 645. Although the shown node has one incoming fiber-optic link 641 having two fiber strands and one outgoing fiber-optic link 642 having two fiber strands, in general there is one downstream side LDP entity 611 to each incoming physical link. And each downstream side LDP entity 611 has a private label information database 620. Consequently, label information is stored on a per physical link basis. Similarly, there is one upstream side LDP entity 612 corresponding to each outgoing link 642. And each upstream side LDP entity 612 has its own mirror of label information (LIM) 621. Consequently, the LID 620 has meaning with respect to only one LDP entity 611 and one link 641. Similarly, the LIM 621 has meaning with respect to only one LDP entity 612 and one physical link 642. Different LDP entities in one LSR may employ different TCP/UDP port numbers to communicate with peers.

Turning back to FIG. 2, another aspect of the invention provides a system for facilitating recovery from a control plane failure of a label-switched communication network comprising at least a first 14 and second 12 nodes. The system includes a first control plane device 142 associated with the first node 14, a second control plane device 122 associated with the second node 12, and a control link 22 between the first and second control plane devices. The first control plane device 142 is operative to allocate labels to data links between the first 14 and second 12 nodes in communication with the second device 122, and has a first memory 145 for storing control plane information 28 comprising first information 731 related to unallocated labels and second information 732 related to allocated labels. The second control plane device 122 has a second memory 125 for storing a copy 734 of the first information and a copy 735 of the second information received from the first control plane device 142. Following a control plane failure related to said first device 142, said second device 122 is operative to transmit the copy 734 of the first information to said first device 142, and said first device 142 is operative to return to an operating state upon receiving the copy 734 of the first information, and prior to receiving the copy 735 of the second information.

The invention provides a distributed mechanism of communication network recovery from control plane interruptions, which provides a recovery method which is applicable to both control link and control node types of failure, is easily scalable, and enables to recover lost control-plane information much faster than the prior art control recovery methods. Results of a performance analysis of the method of the present invention for LDP recovery in comparison to prior art solutions are described in an article "Recovery from control plane failures in the LDP signalling protocol", in Journal of Optical Switching and Networking, 2005, v. 2, issue 3, pp. 148-162, which is authored by the inventors of the present invention, and which is incorporated herein by reference.

In the aforedescribed embodiments of the invention, the label, or connection information that the control plane of a node maintains, is copied to a control plane device of an upstream node. However, other embodiments of the invention could also be envisioned wherein the connection information is copied elsewhere, and then provided to the node using the aforedescribed steps of the coarse and detailed recovery once the need arises, e.g. to recover from a control plane interruption. In these embodiments, the invention would still provide advantages by reducing the recovery time. In one alternative embodiment, the present invention could be employed with a centralized recovery mechanism, wherein LIMs associated with LIDs of a plurality of nodes are stored at one location. The centralized recovery mechanism could be beneficial for regional recovery. More particularly, if the control plane of a large region of a domain fails, and some kind of centralized control plane backup is provided for that domain, the control information can be recovered through a centralized method.

Of course numerous other embodiments may be envisioned without departing from the spirit and scope of the invention.

We claim:

1. A method for operating a communication network, the communication network comprising a first node for providing connections for data traffic, a control plane comprising a first control means operative to allocate labels for said connections and to maintain connection-related label information, a second control means, and a control channel therebetween, the method comprising:
   A) providing a copy of the connection-related label information maintained by the first control means to the second control means to store therein, the connection-related label information including first information related to currently unallocated labels and second information comprising information related to labels currently in use;
   B) following an interruption in the control plane, updating the connection-related-label information maintained at the first control means by:
      (a) transmitting a copy of the first information from the second control means to the first control means;
      (b) receiving the copy of the first information at the first control means and updating therewith the connection-related label information stored at the first control means;
      (c) operating the control plane for allocating the currently unallocated labels to data traffic at the first node by the first control means; and,
      (d) with the control plane operative to allocate the currently unallocated labels, updating, at the first control means, the second information using a copy of the second information stored at the second control means.

2. A method of claim 1 wherein the first information indicates unallocated labels, and the second information comprises information related to allocated labels and additional label-related information.

3. A method of claim 2 wherein the first information comprises a list of unallocated labels.

4. A method of claim 1 wherein the first and second control means are operative to exchange messages using a label distribution protocol (LDP).

5. A method of claim 4, wherein step (A) comprises synchronizing the copy of the connection-related label information stored at the second control means and the connection-related label information maintained at the first control means using LDP label mapping or label release messages.

6. A method of claim 4, wherein step (d) comprises the steps of:
   sending by the first control means an LDP query message requesting information related to a label allocated by the first control means in response to receiving an LDP request for modifying a connection associated with said label; and,
   updating a portion of the second information that is related to said label.

7. A method of claim 4, wherein steps (a)-(b) are performed using an LDP session initialization procedure.

8. A method of claim 7 wherein the LDP session initialization procedure comprises the steps of:
   sending by one of the first and second control means to the other of the first and second control means an LDP message indicating an intention to start an information recovery;
   transmitting by the second control means to the first control means one or more Type-Length-Value (TLV) objects indicating unallocated labels according to the copy of the first information stored at the second control means;
   responsive to the received one or more TLV objects, updating the first information related to unallocated labels at the first control means to provide updated first information.

9. A method of claim 8, further comprising the step of transmitting at least a portion of the updated first information from the first control means to the second control means for synchronizing the copy of the first information stored at the second control means with the updated first information stored at the first control means.

10. A method of claim 1 wherein the second control means is associated with a second node, and is operative to request a label allocation for data traffic between the second node and the first node.

11. A method of claim 1 wherein the control plane comprises a third control means associated with a third node and operative to support a control link the third and first control means, the method further comprising the steps of:
   using the third control means to allocate connections for data traffic between the first and third nodes and to maintain label information related to said connections, and
   using the first control means to receive a copy of said label information maintained by the third control means using said control link between the first and third control means, and to store said copy at the first control means.

12. A method of claim 1 wherein the first information constitutes less than a half of the connection-related label information maintained by the first control means.

13. A method of claim 1 wherein step (b) comprises updating the first information at the first control means using an intersection of the first information stored at the first control means and the copy of the first information received from the second control means.

14. A device for controlling data plane connections at a first node of a communication network, said communication network also including a second node, the device comprising:
   a processor for executing a software application for allocating labels to data traffic between the first node and the second node responsive to requests from a control means for controlling data plane connections at the second node;
   a memory coupled to the processor for use by the software application for storing label information, said label information comprising first information indicating unallocated labels and second information comprising information related to allocated labels; and,
   a port for communicating with the control means of said second node for exchanging label information;
   wherein the processor is operative to
      send the label information via the port to the control means of the second node for storing therein;

receive a copy of the first information stored at the second node following an interruption in communication with the second node;

update the first information stored in the memory using the copy of the first information received from the control means controlling the second node; and, responsive to a label allocation request, execute the software application for allocating a label to a connection using the updated first information prior to receiving a copy of the second information.

15. A device of claim 14, wherein the software application is an LDP application.

16. A device of claim 14 wherein the processor is operative, during the execution of the software application following receiving of the copy of the first information from the second node, to receive the second information from the second node.

17. A device of claim 14 wherein the processor is operative, during the execution of the software application, to request information about the allocated labels from the second node upon receiving a request to modify an existing connection.

* * * * *